United States Patent [19]
Attwood et al.

[11] 3,721,463
[45] March 20, 1973

[54] POST ADAPTER

[75] Inventors: Warren R. Attwood, Wayne; Herbert J. Henry, Plymouth; Hugo E. Rebentisch, Jr., Garden City, all of Mich.

[73] Assignee: Unistrut Corporation, Wayne, Mich.

[22] Filed: Nov. 23, 1970

[21] Appl. No.: 91,948

[52] U.S. Cl.............287/20.3, 248/221, 248/226 R
[51] Int. Cl...............................................F16b 9/00
[58] Field of Search.......248/121, 221, 188.9; 85/70, 85/71; 287/126, 20 R, 20.3, 124; 211/182

[56] References Cited

UNITED STATES PATENTS

| | | | |
|---|---|---|---|
| 2,155,827 | 4/1939 | Herold | 85/70 X |
| 3,198,562 | 8/1965 | Smith | 287/126 X |
| 3,508,731 | 4/1970 | Jablonski | 248/221 |

FOREIGN PATENTS OR APPLICATIONS

| | | | |
|---|---|---|---|
| 5,456 | 1894 | Great Britain | 287/126 |

*Primary Examiner*—William H. Schultz
*Attorney*—Hauke, Gifford & Patalidis

[57] ABSTRACT

An adapter for releasably securing an assembly, such as a parking meter, to the top of a hollow post and including a resilient member having a tapered bore formed therein. The resilient member is inserted over a complementary tapered base member extending from the lower surface of the assembly. A nut is threaded onto the lower end of a bolt which extends through the base member for retaining the resilient member thereon. The periphery of the nut is shaped so as to non-rotatably engage with the inner surface of the hollow post upon which the assembly is to be mounted. The nut, the resilient member, the tapered member, and the bolt extending from the lower surface of the assembly are inserted into the post and the bolt rotated so as to screw the nut onto the bolt, compressing the resilient member to wedge it onto the tapered base member, causing the resilient member to expand between the base member and the inner surface of the post so as to fixedly secure the assembly onto the post. The base member and the bore in the resilient member are frusto-conical in one modification and substantially pyramidal in another.

11 Claims, 6 Drawing Figures

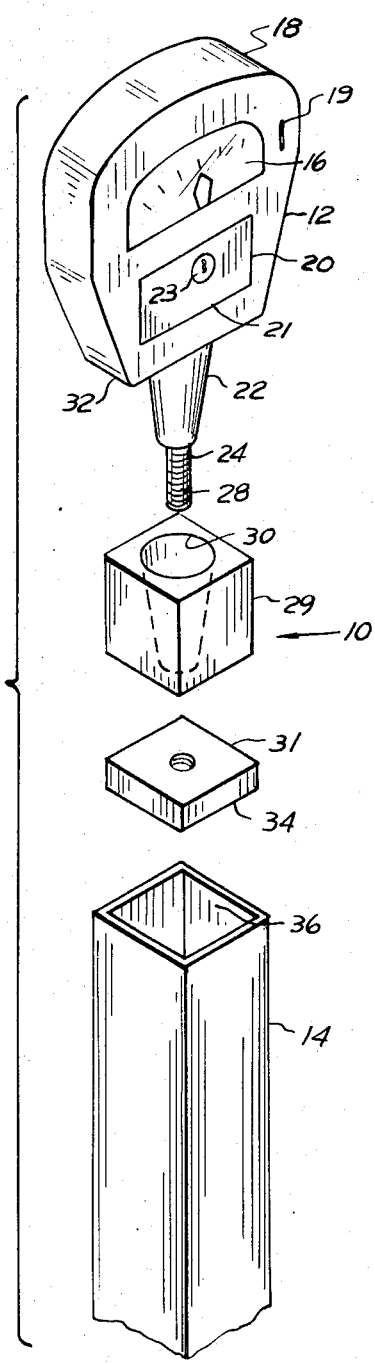
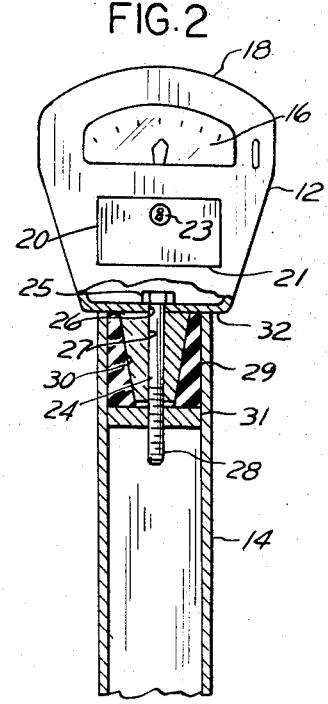
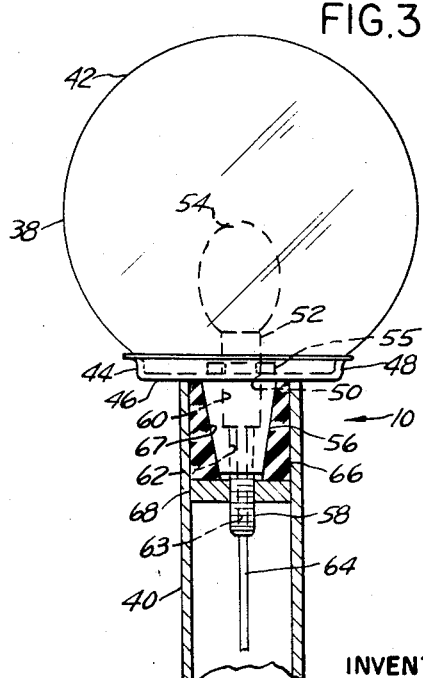

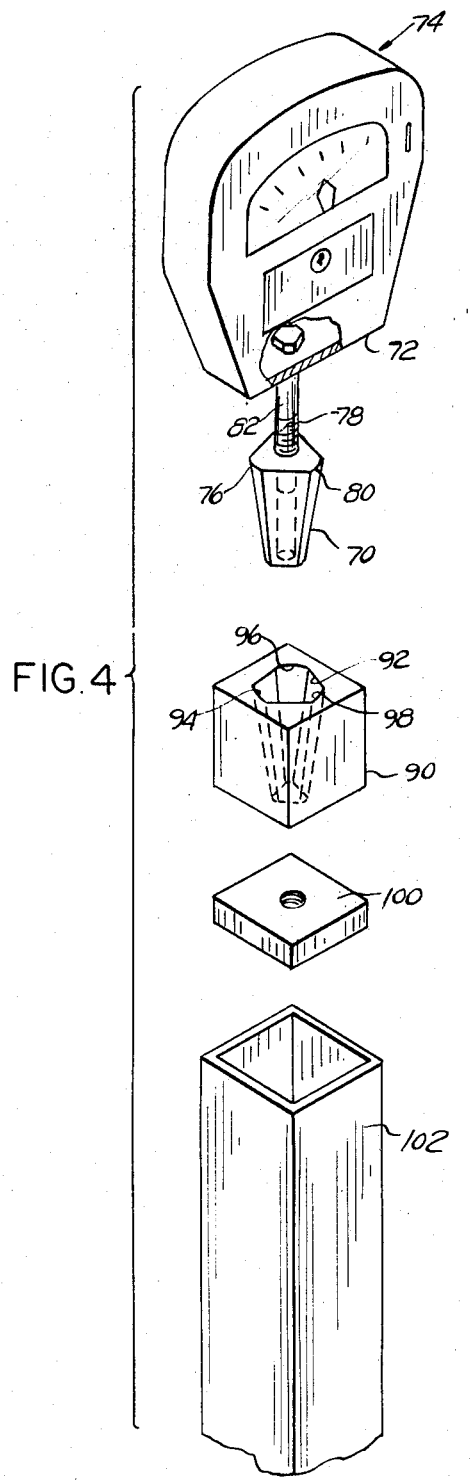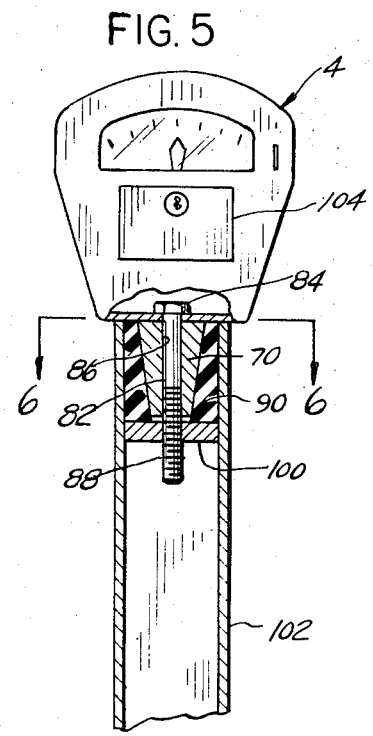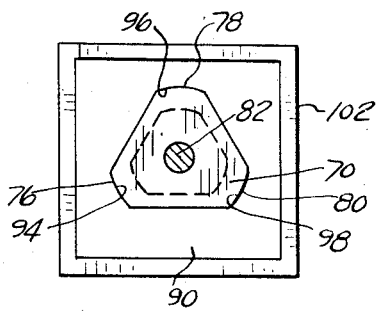

POST ADAPTER

BACKGROUND OF THE INVENTION

1. Field Of The Invention

The present invention relates generally to adapters for hollow posts, and more particularly to an improved construction for detachably mounting an assembly onto a hollow post.

2. Description Of The Prior Art

Heretofore, assemblies such as parking meters and the like have been secured to the top of posts by welding or otherwise permanently affixing the assemblies thereto. This creates the problem that when either the assembly or the post is damaged, it is difficult and expensive to remove the undamaged member from the damaged member so that the undamaged member may be reused.

Also, assemblies have been bolted onto the tops of posts in such a manner that they are often difficult to remove. This has been necessary, since otherwise the assembly could be easily removed and stolen.

SUMMARY OF THE PRESENT INVENTION

The present invention solves the problems of the prior art by providing an inexpensive means for detachably securing an assembly, such as a parking meter, to the top of a hollow post. Conventional parking meter heads include a coin-operated meter surrounded by a housing. A tapered base member secured at one end to the lower surface of the meter extends downwardly therefrom. This member may be frusto-conically or substantially pyramidally shaped. A bolt extends downwardly through the base member along its longitudinal axis with the threaded end of the bolt extending through the lower end. An adapter of the present invention includes a resilient anchor unit which has a tapered aperture formed therein for receiving the tapered base member extending downwardly from the parking meter head. The adapter further includes a nut for threading onto the threaded end of the bolt to retain the anchor unit on the base member. The outer periphery of the nut is shaped so as to fit into and engage the inner surface of the hollow post onto which the parking meter is to be mounted. The post is non-cylindrical, or has a non-cylindrical interior surface, and the anchor unit of the adapter is complementarily shaped to fit.

The base member is inserted into the aperture formed in the anchor unit and the nut threaded onto the bolt. The base member, the anchor unit, and the nut are then inserted into the hollow post upon which the meter is to be mounted. A wrench or other suitable tool is then inserted through a normally locked door provided in the parking meter head to turn the bolt and hence tighten the nut, which is prevented from turning by its engagement with the inner surface of the post. As the nut is tightened onto the bolt, the anchor unit is compressed between the lower surface of the parking meter head and the nut, wedging it onto the base member and causing the anchor unit to expand between the base member and the inner surface of the post. This wedging and the resulting frictional engagement between the anchor unit and the inner surface of the post prevents the parking meter head from being removed from the post. If either the post or the parking meter is damaged, the bolt and nut may readily be loosened to relax the anchor unit, so that the parking meter may be removed from the hollow post.

BRIEF DESCRIPTION OF THE DRAWINGS

The description refers to the accompanying drawings wherein like reference characters refer to like parts throughout the several views, and in which:

FIG. 1 is an exploded view of a parking meter assembly embodying the adapter of the present invention;

FIG. 2 is a front view of the assembly of FIG. 1 seen partially in cross-section showing the adapter as used to secure the parking meter onto a post;

FIG. 3 is a view partially in cross-section showing the adapter as used to secure a lamp onto a hollow post;

FIG. 4 is an exploded view of a parking meter assembly illustrating another embodiment of the adapter of the present invention;

FIG. 5 is a front view partially in cross-section of the assembly of FIG. 4 showing the adapter as used to secure the parking meter onto a post; and FIG. 6 is a cross-sectional view taken substantially along line 6—6 of FIG. 5.

DESCRIPTION OF THE PREFERRED EMBODIMENT

Referring to the drawings, an adapter, generally indicated at 10, is illustrated for securing a conventional parking meter head 12 to a hollow parking meter post 14. The post is preferably square, but other non-cylindrical posts or posts having non-cylindrical interior surfaces may be used. The parking meter head includes a conventional coin-operated time metering unit 16 surrounded by an outer housing 18, having the conventional coin slot 19 formed therein. The housing 18 is provided with a door 20 hinged as at 21 and provided with a key-operated lock 23 at its upper edge for providing access into the housing 18 so that the coins may be removed. The parking meter head 12 includes a tapered base member 22 having its large diameter end secured to or integral with the lower surface 32 of the housing 18 and extending downwardly therefrom. A bolt 24, having a head 25 disposed within the housing 18, extends downwardly through an aperture 26 formed in the housing 18 and an aperture 27 formed in the base member 22 along its longitudinal axis. The bolt 24 terminates in a threaded portion 28 extending from the lower end of the base member 22.

The adapter 10 for detachably securing the parking meter head 12 to the hollow parking meter post 14 includes an anchor unit 29, preferably formed from resilient material such as hard rubber or plastic and complementarily shaped to fit the inner surface of the post 14. The anchor unit 29 includes a tapered aperture 30 formed therethrough for receiving the complementary shaped base member 22. As shown, the base member 22 and the aperture 30 in the anchor unit 29 are complementarily frusto-conically shaped. A nut 31 is screwed onto the threaded portion 28 of the bolt 24 to secure the anchor unit 29 between the lower surface 32 of the housing 18 and the nut 31. The nut 31 is preferably shaped to fit the inner surface of the post, but any shape which will coact to prevent the nut from turning inside the post may be used.

The assembled base member 22, bolt 24, anchor unit 29, and nut 31 are inserted into the top opening 36 of the hollow parking meter post 14. The door 20 is opened and a wrench or other suitable tool inserted to turn the bolt 24 so that the nut 31, which is prevented from rotating by its engagement with the inner surface of the post 14, is threaded onto the bolt 24, wedging the anchor unit 29 further onto the tapered base member 22, compressing the unit 29 against the lower housing surface 32, and thereby causing the unit 29 to expand between the base member 22 and the inner surface of the parking meter post 14. With the anchor unit 29 so compressed and expanded, the wedging and the frictional engagement between it and the inner surface of the post 14 is sufficient to prevent the parking meter head 12 from being pulled off of the post 14 or from being wrenched around from its intended position. The door 20 is closed and locked, preventing anyone from loosening the nut 31 and removing the parking meter head 12. If it is desired to remove the head 12 from the post 14, the door 20 may be unlocked and opened and the bolt and nut loosened, so that the parking meter head 12 may be pulled off of the post 14.

Since the parking member adapter 10 allows the parking meter head 12 to be easily and quickly removed from the post 14 with the use of an appropriate tool, if the parking meter head 12 becomes damaged, it may be quickly and easily removed from the post 14 and replaced with a parking meter head which is in proper working condition. Furthermore, if the post 14 becomes damaged and must be replaced, the parking meter head 12 may be quickly and easily removed from the damaged post, a new post put in its place and the meter head secured onto the new post.

Referring to FIG. 3, it will be seen that the adapter 10 may also be used for securing a lighting fixture 38 or any other appropriate device, fixture, appliance, sign or the like to the top of a hollow post 40. The lighting fixture 38 includes an outer glass globe 42 or the like secured onto a mounting plate 44, which may have a generally flat circular center section 46 with an outer annular upwardly extending flange 48 therearound for receiving the globe 42. The section 46 has a central opening 50 with a bulb receptacle 52 extending therethrough into the globe 42 for receiving a light bulb. A nut 55 is positioned around the receptacle 52 above the section 46 and secured to the receptacle as by welding, bonding or the like. A tapered base member 56 has its larger diameter end secured to the lower surface of the section 46 as by welding, bonding or the like, and extends downwardly therefrom. The lower portion of the receptacle 52 is preferably disposed within a cylindrical chamber 60 formed in the base member 56. A threaded stud 58 having one end secured to the receptacle 52 extends downwardly therefrom through an aperture 62 formed in the base member 56. The stud 58 is hollow as at 63 for electric wires 64 to extend therethrough.

The adapter unit includes an anchor unit 66 shaped complementary with the interior of the post 40 and preferably formed from a resilient material such as hard rubber or plastic, and is formed with a tapered aperture 67 therethrough. A nut 68 is provided for threading onto the stud 58. Thus, the anchor unit 66 may be placed onto the base member 56 and the nut threaded onto the stud 58. The assembly is then inserted into the post 40 and the nut 55 turned with a wrench or other suitable tool, rotating the receptacle 52 and the stud 58, threading the nut onto the stud 58 to wedge the unit 66 further onto the base member 56, compressing the unit 66 between the lower surface of the plate 44 and the nut 68 and expanding it between the base member 56 and the inner surface of the post 40. The wedging and the frictional engagement between the anchor unit 66 and the inner surface of the post 40 maintains the lighting fixture 38 fixedly secured to the top of the post 40. Once secured on the post 40, the globe 42 may be secured onto the plate 44.

Referring to FIG. 4, another embodiment of the invention is illustrated wherein a tapered member 70, which has its larger end secured to a lower surface 72 of a parking meter head 74 has a generally pyramidal shape with the corners at 76, 78 and 80 preferably rounded as shown. A bolt 82 having a head 84 extends through an aperture 86 formed through the member 70 and has a threaded portion 88 extending from the lower end thereof.

The adapter of this embodiment includes an anchor unit 90, preferably formed from resilient material such as hard rubber or plastic and formed complementary to the interior surface of a post 102. The unit 90 has a substantially pyramidally shaped aperture 92 extending therethrough and rounded at corners 94, 96 and 98 so as to mate with the member 70. A nut 100 is provided for threading onto the bolt 82. Thus, the anchor unit 90 may be placed onto the member 70 and the nut threaded onto the bolt 82. The assembly is then inserted into the hollow post 102 and the bolt head 84 turned with a wrench or other suitable tool. Upon rotation, the nut 100 is threaded further onto the bolt 82, wedging the unit 90 onto the member 70 thereby compressing the unit 90 between the lower surface 72 and the nut 100 and causing the unit 90 to expand between the member 70 and the inner surface of the post 102. The wedging and the frictional engagement between the unit 90 and the inner surface of the post 102 prevents the meter 74 from being removed from the post 102.

Although we have described but a few preferred embodiments of our invention, it is to be understood that various changes and modifications can be made therein without departing from the spirit of the invention or the scope of the appended claims.

We claim:

1. An adapter for detachably securing an article adjacent an open end of a hollow post, comprising:

an elongated tapered base member having its larger end secured to said article and an aperture formed therethrough substantially parallel to its longitudinal axis;

an elongated retaining member extending through said aperture with an enlarged end disposed adjacent the larger end of said base member and a threaded end extending outward from the free end of said base member;

a compression resilient member shaped to be received into said open end and having a tapered aperture formed therein for positioning around said tapered base member;

a nut for threading onto the threaded end of said retaining member to wedge the resilient member on the base member, and to longitudinally compress said resilient member thereby expanding same between said tapered member and the inside surface of the hollow post; and said nut and said post having means engaging to prevent rotation of said nut within said post.

2. The adapter as defined in claim 1, wherein said resilient member is formed from hard rubber.

3. The adapter as defined in claim 1, wherein said resilient member is formed from hard plastic.

4. The adapter as defined in claim 1, wherein said elongated tapered base member is frusto-conically shaped and said tapered aperture formed in said resilient member is frusto-conically shaped.

5. The adapter as defined in claim 1, wherein said elongated tapered member is substantially pyramidally shaped.

6. The adapter as defined in claim 5, wherein said tapered aperture formed in said resilient member is substantially pyramidally shaped.

7. The adapter as defined in claim 1, wherein said nut is rectangularly shaped and the inner surface of the hollow post is rectangularly shaped in cross-section.

8. A parking meter and support post assembly comprising:

a hollow post;

a meter housing for mounting on the upper open end of said post, said housing having an interior chamber adjacent a bottom wall and access means thereto;

an elongated tapered base depending from said bottom wall, and a bore extending longitudinally through said base and through said bottom wall;

an elongated retaining member extending through said bore with an enlarged head disposed in said housing chamber and a threaded end extending outward from the lower end of said base;

a compression resilient member shaped to be received into an end of said post and having a tapered aperture formed therein for positioning around said tapered base;

a nut for threading onto the threaded end of said retaining member to wedge said resilient member on the base member, and to longitudinally compress said resilient member thereby expanding same between said tapered member and the inside surface of the hollow post; and said nut and said post having means engaging to prevent rotation of said nut within said post.

9. The assembly as defined in claim 8, wherein said base and the aperture in the resilient member are complementarily frusto-conically shaped.

10. The assembly as defined in claim 8, wherein said base and the aperture in the resilient member are complementarily substantially pyramidally shaped.

11. The assembly as defined in claim 8, wherein the interior of said hollow post and said nut are rectangular and have an interference fit to prevent the nut from turning within the post.

* * * * *